United States Patent [19]

Uchinami et al.

[11] Patent Number: 5,760,486
[45] Date of Patent: Jun. 2, 1998

[54] CHARGE CONTROL SYSTEM FOR USE IN INTERNAL COMBUSTION ENGINE

[75] Inventors: Masanobu Uchinami; Akira Morishita; Katsumi Adachi, all of Tokyo, Japan

[73] Assignee: Mitsubishi Denki Kabushiki Kaisha, Tokyo, Japan

[21] Appl. No.: 569,983

[22] Filed: Dec. 8, 1995

[30] Foreign Application Priority Data

Mar. 31, 1995 [JP] Japan .................. 7-076346

[51] Int. Cl.$^6$ .................................................. H02P 9/10
[52] U.S. Cl. ...................... 290/40 C; 322/58; 322/59
[58] Field of Search .............. 290/40 C; 322/28; 320/64

[56] References Cited

U.S. PATENT DOCUMENTS

| | | | |
|---|---|---|---|
| 4,542,462 | 9/1985 | Morishita et al. | 364/424 |
| 4,583,036 | 4/1986 | Morishita et al. | 320/39 |
| 4,651,081 | 3/1987 | Nishimura et al. | 320/64 |
| 4,670,704 | 6/1987 | Maehara et al. | 322/8 |
| 5,216,350 | 6/1993 | Judge et al. | 322/25 |
| 5,448,154 | 9/1995 | Kanke et al. | 322/28 |

FOREIGN PATENT DOCUMENTS

| | | |
|---|---|---|
| 438 884 | 7/1991 | European Pat. Off. . |
| 26 43 612 | 4/1977 | Germany . |
| 2643612 | 4/1977 | Germany . |
| 41 08 751 | 3/1990 | Germany . |
| 43 21 970 | 1/1994 | Germany . |

*Primary Examiner*—Steven L. Stephan
*Assistant Examiner*—Nicholas Ponomarenko
*Attorney, Agent, or Firm*—Sughrue, Mion, Zinn, Macpeak & Seas, PLLC

[57] ABSTRACT

A charge control system for an internal combustion engine which is capable of suppressing electromagnetic noise due to a control signal to a generator, and which prevents overcharging a battery even if an input terminal receiving the control signal is grounded. The charge control system is composed of a generator 1 driven by an engine of a motor vehicle and a battery 4 charged with the output of the generator 1. Also included in the system is a computer unit 2 comprising a microcomputer CPU for calculating a target voltage Vreg on the basis of the operational states of the motor vehicle for comparison with a battery voltage Vb so as to output a drive signal in accordance with the comparison result. This drive signal operates a transistor Tr, incorporated into the generator, to control a field current 1f of the generator 1 so that the quantity of the power generation of the generator 1 increases and decreases to control the quantity of the charge to the battery 4.

3 Claims, 3 Drawing Sheets

CHARGE CONTROL SYSTEM FOR USE IN INTERNAL COMBUSTION ENGINE

BACKGROUND OF THE INVENTION

1. Field of the Invention

The present invention relates to a charge control system for controlling a charge to a battery from a generator (dynamo) driven by an internal combustion engine, and more particularly to a charge control system including a microcomputer for electronically controlling the output of the generator for the charging of a battery.

2. Description of the Prior Art

Japanese Patent Publication No. 6-67133, for example, discloses a microcomputer-based, electronically controlling alternating-current (AC) generator for motor vehicles, wherein a microcomputer controls its field current to increase and decrease the quantity of the power generation, i.e., the quantity of charge to a battery on the basis of the detection results of various sensors such as a battery temperature sensor, a vehicle speed sensor, and a throttle sensor for detecting an opening degree of a throttle valve. Such a microcomputer-controlled AC generator is equipped with a transistor serving as an electronic switching device and incorporated in the computer unit, which transistor controls the current (field current) flowing into the field coil of the generator. In response to the control of the field current, the output voltage of the generator is controlled to a given value, while charging the battery under this control. As a rule, the generator is disposed in an engine compartment, whereas the computer unit is located in the passenger compartment of the motor vehicle. For this reason, wires connecting the generator and the computer unit become relatively long, e.g., 2 to 3 meters long, so that large electromagnetic noise is caused by a current of approximately 4 A usually flowing into the field coil of the generator, thus greatly affecting a vehicle-mounted radio and other electric articles or accessories. For the suppression of such electromagnetic noise, countermeasures have been taken, for example, the ON/OFF operating speed of the transistor is made to be slow or a noise-preventing filter is provided to prevent the noise from leaking to the outside of the computer unit. These noise countermeasures raise the manufacturing cost, while requiring much time and work for the confirmation of their effectiveness in a development stage.

Moreover, in such a prior system, the field-current controlling transistor is located at a downstream side (grounded side) of the field coil and the wires connecting the generator and the computer unit are disposed at an upstream side of the transistor, with the result that, if the connecting wires or a terminal at the generator or computer unit side accidentally become grounded, the field current continues to flow without passing through the transistor. This makes it difficult to control the quantity of the power generation, thus bringing the generator continuously into the power-generating state to cause an overcharge.

SUMMARY OF THE INVENTION

The present invention has been developed with a view to eliminating the above-mentioned problems, and it is therefore an object of the present invention to provide a charge control system for an internal combustion engine which is capable of suppressing electromagnetic noise caused by the ON/OFF action of a transistor and further of stopping the generating operation of a generator to avoid overcharging the battery if a grounding takes place for some reason.

In accordance with the present invention, a charge control system for an internal combustion engine comprises a generator driven by the internal combustion engine to generate electric power, an electronic switching device built in the generator and operable with a limited current for controlling a field current of the generator, a battery charged by an output of the generator, and a computer unit coupled to the generator and further to the battery for comparing a voltage of the battery with a target (reference) voltage to output a drive signal in accordance with the comparison result, so that the electronic switching device is driven to control the field current of the generator to increase and decrease the quantity of power generation due to the generator to control the quantity of charge to the battery.

With this arrangement, the generator is controlled with a limited current from the computer unit so that the generation of electromagnetic noise can be reduced to a level that hardly cause any problems. As a result, countermeasures such as the provision of a noise preventing filter for suppressing electromagnetic noise become unnecessary, which avoids an increase in manufacturing cost and which makes it unnecessary to expend time and effort confirming their effectiveness.

In a preferred form of this invention, the charge control system further comprises a field current control circuit for inhibiting the flow of the field current in cases where, when terminals of the electronic switching device are incorporated in the generator, an input terminal receiving a drive signal from the computer unit becomes grounded.

Thus, the field current control circuit is constructed such that when the drive signal input terminal of the electronic switching device incorporated in the generator is grounded for some reason, the field current does not flow, with the result that the generating operation of the generator stops to prevent overcharging to the battery.

In another preferred form of this invention, the drive signal for driving the electronic switching device has a predetermined fixed frequency, and its duty ratio is controlled in accordance with a deviation between the target voltage and the voltage detected.

That is, the electric switching device is driven with a duty ratio corresponding to the deviation of the battery voltage from the target voltage so as to control the field current. Accordingly, in addition to this arrangement permitting finer charge quantity control, because the electronic switching device is built in the generator, the electronic switching device is operable with a small or limited current even if the drive signal has a high frequency, thus suppressing the occurrence of the electromagnetic noise.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

A description will be made hereinbelow of preferred embodiments of the present invention with reference to the drawings.

First Embodiment

Figure 1:
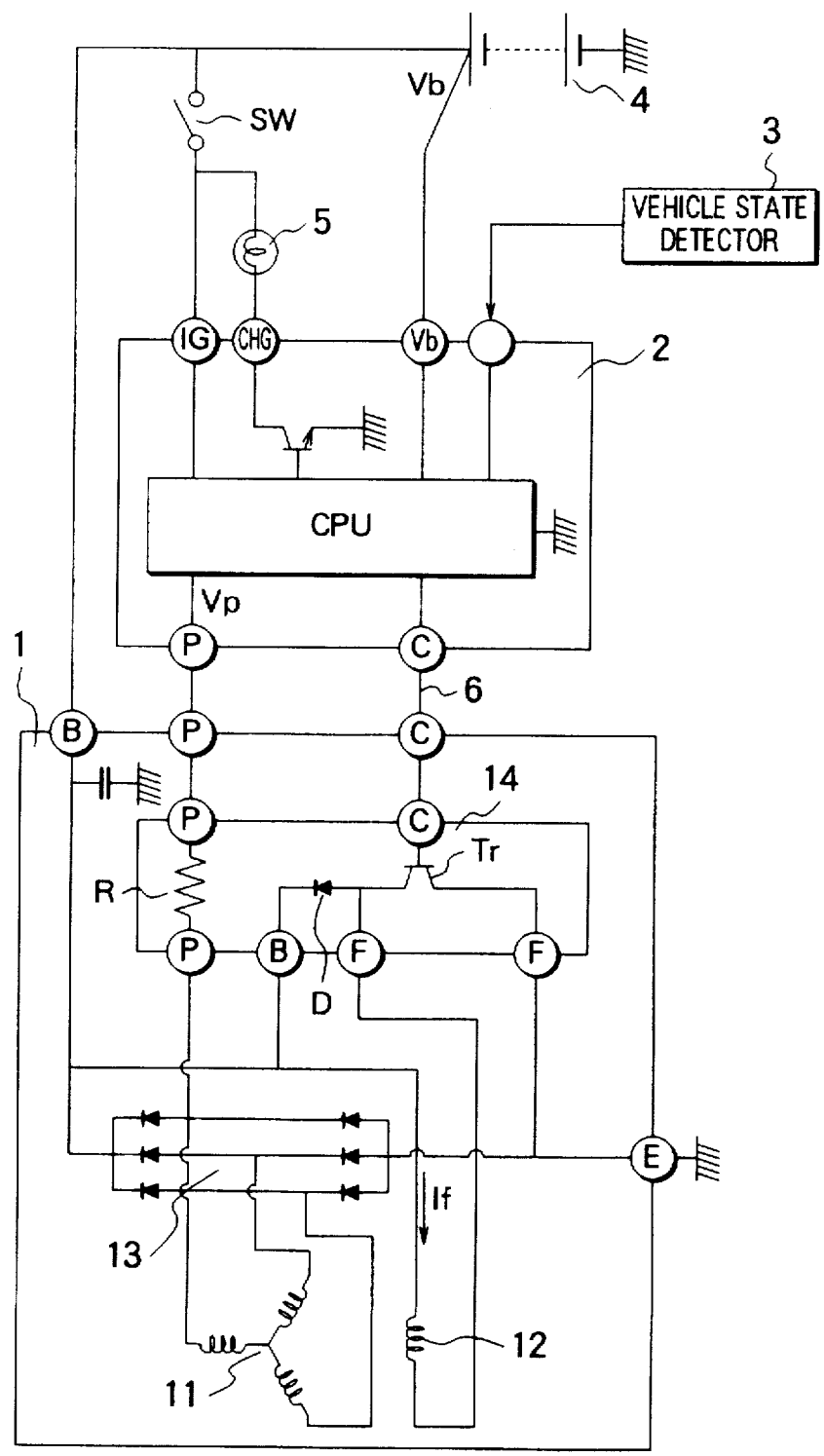
FIG. 1 is a circuit diagram showing an arrangement of a charge control system for an internal combustion engine according to this invention.
Figure 2:
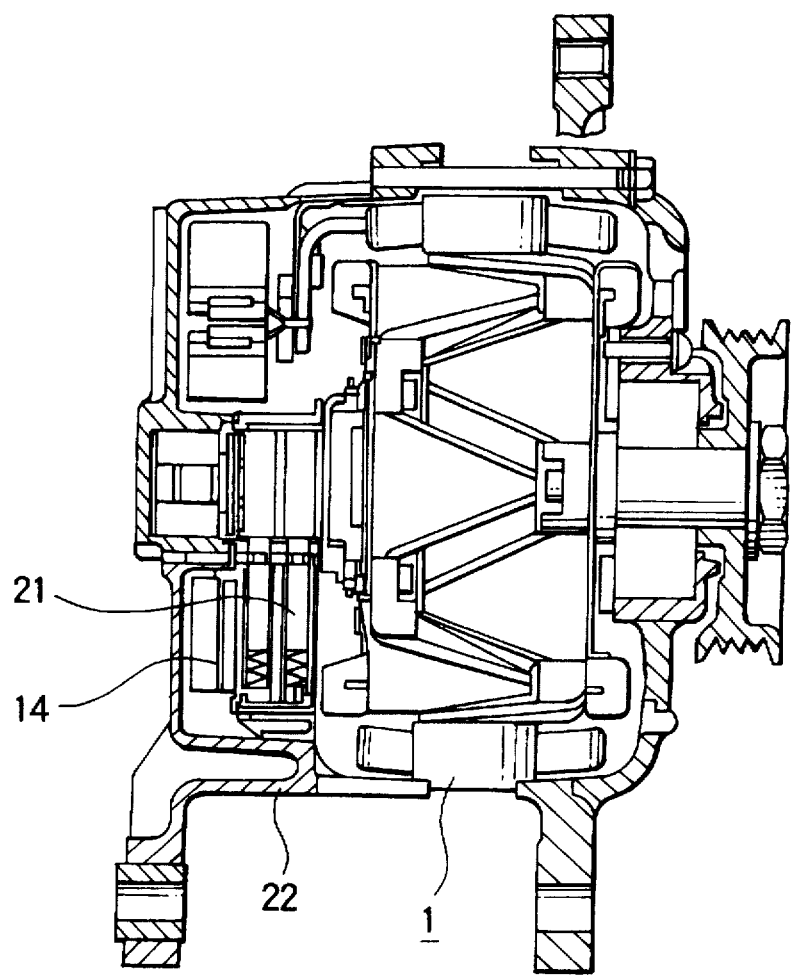
FIG. 2 is a cross-sectional view showing a structure of a generator of the charge control system according to this invention.

FIG. 1 shows in a diagrammatic form an arrangement of a charge control system for an internal combustion engine according to a first embodiment of this invention, and FIG. 2 shows in cross section a construction of a generator used in the charge control system. In FIG. 1, a charge control system for an internal combustion engine includes a generator 1 driven by an internal combustion engine of a motor vehicle such as a car, a computer unit 2 for controlling the output of the generator 1, a vehicle state detector 3 for detecting the operational states (for example, a battery temperature, vehicle speed, and throttle opening degree) of the motor vehicle necessary for calculations the computer unit 2 performs, and a battery 4 charged by the output of the generator 1. More specifically, the generator 1 is provided with a three-phase armature coil 11 and a field coil 12, the output thereof being made to increase and decrease in such a way that a field current 1f flowing through the field coil 12 is controlled with an electronic switching device operable with a small or limited current and driven in accordance with a drive signal from the computer unit 2. The output of the generator 1 is rectified with a built-in three-phase full-wave rectifier 13.

In this embodiment, the electronic switching device is composed of a transistor Tr which, as shown in FIG. 2, is mounted on an IC substrate 14 disposed in the vicinity of a brush 21 in a bracket 22. In addition to the transistor Tr, the IC substrate 14 has a commutation diode D and a resistor R for protecting the computer unit 2 against a short-circuit current.

The computer unit 2 includes a microcomputer CPU which outputs a drive signal for operating the transistor Tr on the basis of the detection results of the vehicle state detector 3, a voltage Vb of the battery, and the like. This microcomputer CPU also executes the fuel injection control and the ignition timing control for the motor vehicle. A description of these operations is omitted because they are not directly associated with this invention. Moreover, the computer unit 2 receives, as an input, the output (Vp) of the generator 1, corresponding to one phase, through a smoothing circuit, not shown. On the basis of this input, the computer unit 2 checks whether or not the battery being normally charged by the output of the generator 1, and further executes a charge display control operation, i.e., turns a charge (CHG) alarm lamp 5 on if the battery is not being charged. The generator 1 and the computer unit 2 are coupled relation to each other through a lead wire 6. Further, the computer unit 2 is connected with the battery 4 through a main switch SW.

Figure 3:
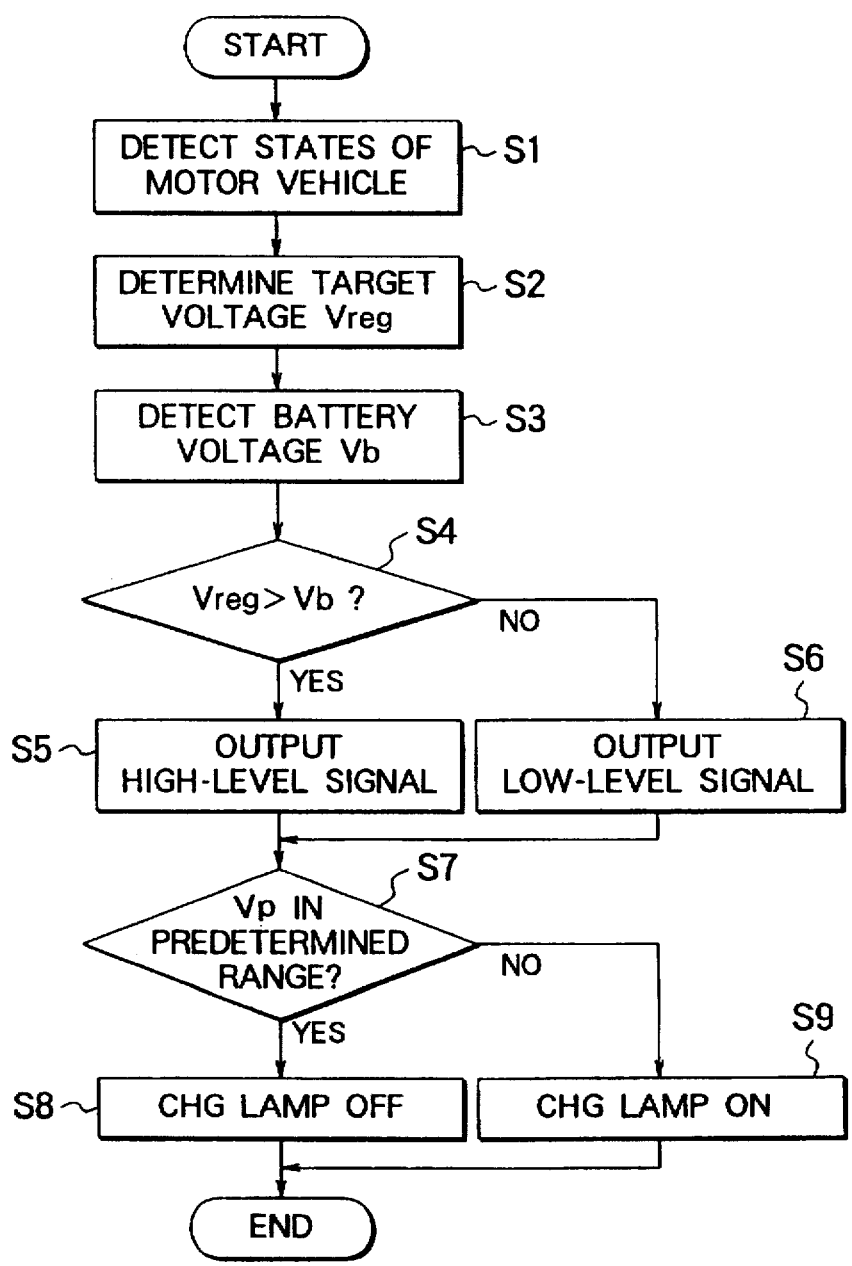
FIG. 3 is a flow chart showing an operation of a computer unit of the charge control system according to this invention.

Secondly, a description will be taken in conjunction with FIG. 3 in terms of an operation of the computer unit 2. This operation begins with a step S1 to detect the operational states of the motor vehicle using the vehicle state detector 3, followed by a step S2 to determine a target voltage Vreg for the generator 1 on the basis of the detection results in step S1. The operational flow advances to a step S3 to detect the battery voltage Vb and then proceeds to a step S4 to compare the detected battery voltage Vb with the determined target voltage Vreg. If Vreg>Vb, the operational flow goes to a step S5 to issue a high-level signal to turn the transistor Tr on. On the other hand, if Vreg is not greater than Vb, the operational flow advances to a step S6 to produce a low-level signal which turn the transistor Tr off. Such an ON/OFF drive of the transistor Tr, controls the field current 1f flowing through the field coil 12. Subsequently, after the completion of the step S5 or S6, a step S7 follows in order to check whether the output Vp, corresponding to one phase, of the armature coil 11 of the generator 1, is within a predetermined range. If Vp is within the predetermined range, the operational flow proceeds to a step S8 wherein, assuming that the output of the generator 1 is sufficient to charge the battery 4, the charge alarm lamp 5 turns off, and the operation terminates. On the other hand, if Vp is out of the predetermined range, the operational flow goes to a step S9 in which the output of the generator 1 is considered to be insufficient to charge the battery 4, and the charge alarm lamp 5 is turned on.

As described above, since the transistor Tr driven in accordance with the calculation results of the computer unit 2 is incorporated into the generator 1 so as to execute the control of the field current 1f, the output of the generator 1 is controllable with a limited current (approximately 10 mA) representative of a signal from the computer unit 2. This arrangement permits the electromagnetic noise to be reduced to a level which hardly causes any problems.

Still further, as shown in FIG. 1, the transistor Tr built in the generator 1 is positioned at an upstream side of the lead wire 6 connecting a terminal C of the generator and a terminal C of the computer unit 2, and hence, even if these terminals C and the lead wire 6 are grounded for some reason, the transistor Tr turns off irrespective of the drive signal from the computer unit 2 to inhibit the flow of the field current 1f, with the result that the generator 1 stops its power generation to prevent overcharging to the battery 4.

Second Embodiment

Although in the first embodiment the target voltage Vreg calculated in the computer unit 2 is compared with the detected battery voltage Vb so that a high-level or low-level signal is outputted in accordance with the comparison result, in this second embodiment, for the control of the quantity of power generation, a drive duty ratio Df is calculated by an equation, as will be described later, as a function of a deviation $\Delta V$ in voltage between the target voltage Vreg and the battery voltage Vb in accordance with a PID control method so that the transistor Tr is driven with a predetermined fixed frequency, for example, 200 Hz, of the drive duty signal. This can exhibit the same effects as those of the foregoing first embodiment. In addition, when the transistor Tr is subjected to ON/OFF control at a high fixed frequency, countermeasures for electromagnetic noise are required, while the arrangement according to this embodiment can show a large suppression of electromagnetic noises.

The aforesaid equation is as follows:

$$Df = Kp \times \Delta V + *Ki \times \Delta dt + Kd \times (\Delta V(i) - \Delta V(i-1))$$

where Kp represents a constant of proportion, Ki designates an integration constant, Kd depicts a differentiation constant, $\Delta V(i)$ denotes the present voltage deviation, and $\Delta V(i-1)$ signifies the previous voltage deviation.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although the above descriptions have been made of the control of the charge voltage to the battery from the generator of a motor vehicle such as a car, this invention is also applicable to other common generators. In addition, although the transistor Tr has been used as an electronic switching device, any electronic device other than the transistor may be used if it can accommodate the ON/OFF action with a limited current.

What is claimed is:

1. A charge control system for an internal combustion engine, comprising:

a) a generator driven by said internal combustion engine for generating electrical power;

b) an electronic switching device controllable by a relatively low magnitude current for controlling a relatively large magnitude field current of said generator;

c) a battery charged by an output of said generator;

d) a computer unit coupled to said generator and to said battery for comparing a voltage of said battery with a target voltage to output a low magnitude control signal in accordance with the comparison result to control said electronic switching device so that said field current of said generator is controlled to increase and decrease a quantity of its power generation to attendantly control a quantity of charge to said battery, and e) means for preventing i) electromagnetic noise generation by said relatively large magnitude field current, and ii) a continuous field current flow in response to a ground fault in a flow path of said field current, said preventing means comprising disposing and mounting the electronic switching device directly within a physical structure of the generator to prevent generation of electromagnetic noise outside said generator as well as to minimize a conductor length of a flow path of the relatively high magnitude field current through the switching device to ground, wherein said electronic switching device comprises, exclusively, a transistor and a diode.

2. A charge control system as defined in claim 1, further comprising a field current control circuit for inhibiting a flow of said field current when a field current terminal of said electronic switching device or an input terminal thereof receiving said control signal from said computer unit becomes grounded.

3. A charge control system as defined in claim 1, wherein said control signal for said electronic switching device has a predetermined fixed frequency, and a duty ratio of said control signal is controlled in accordance with a deviation between said target voltage and said battery voltage.

* * * * *